United States Patent
Adnitt et al.

(10) Patent No.: US 9,064,480 B2
(45) Date of Patent: Jun. 23, 2015

(54) METHODS AND SYSTEMS FOR AN OBJECT-ORIENTED ARRANGEMENT OF MUSICAL IDEAS

(71) Applicant: inMusic Brands, Inc., Cumberland, RI (US)

(72) Inventors: Timothy Jay Adnitt, London (GB); Wolfram Knelangen, Bremen (DE); John O'Donnell, Ft. Lauderdale, FL (US)

(73) Assignee: INMUSIC BRANDS, INC, Cumberland, RI (US)

( * ) Notice: Subject to any disclaimer, the term of this patent is extended or adjusted under 35 U.S.C. 154(b) by 230 days.

(21) Appl. No.: 13/841,742

(22) Filed: Mar. 15, 2013

(65) Prior Publication Data
US 2014/0208922 A1    Jul. 31, 2014

Related U.S. Application Data

(60) Provisional application No. 61/756,922, filed on Jan. 25, 2013.

(51) Int. Cl.
*G10H 1/00* (2006.01)
*A63H 5/00* (2006.01)
(Continued)

(52) U.S. Cl.
CPC .............. *G10H 1/0025* (2013.01); *G06F 3/033* (2013.01); *G06F 17/00* (2013.01); *G10H 1/00* (2013.01); *G10H 1/0008* (2013.01); *G06F 3/048* (2013.01); *G11B 27/002* (2013.01); *G11B 27/034* (2013.01); *G11B 27/036* (2013.01); *G10H 1/0033* (2013.01); *G10H 2210/125* (2013.01); *G10H 2220/096* (2013.01); *G10H 2220/106* (2013.01); *G10H 2220/116* (2013.01); *G10H 2220/121* (2013.01); *G10H 2240/066* (2013.01); *G10H 2250/641* (2013.01); *G06F 3/04817* (2013.01)

(58) Field of Classification Search
CPC ..... G10H 1/0025; G10H 1/00; G10H 1/0008; G06F 17/00; G06F 3/033
USPC ................... 84/609, 477 R; 700/94; 715/863
See application file for complete search history.

(56) References Cited

U.S. PATENT DOCUMENTS 5,886,274 A * 3/1999 Jungleib ........................ 84/601
7,030,307 B2 * 4/2006 Wedel ........................ 84/477 R
(Continued)

FOREIGN PATENT DOCUMENTS

EP         2541552 A1      1/2013
WO    WO 2013/074207 A1   5/2013

OTHER PUBLICATIONS

APPLE: "GarageBand 3 getting Started", Jan. 2006, pp. 1-98. http://manuals.info.apple.com/MANUALS/0/MA132/en_US/GarageBand_3_Getting_Started.pdf.*
(Continued)

*Primary Examiner* — David Warren
*Assistant Examiner* — Christina Schreiber
(74) *Attorney, Agent, or Firm* — Finnegan, Henderson, Farabow, Garrett & Dunner LLP (57) ABSTRACT

An electronic device and a method for playing a plurality of audio objects is provided. The method includes displaying the plurality of audio objects on a display, each audio object being displayed at a location having a horizontal component and a vertical component, wherein the location of each audio object is changeable by a user.

24 Claims, 10 Drawing Sheets

(51) Int. Cl.
*G09B 15/00* (2006.01)
*G09B 15/02* (2006.01)
*G06F 17/00* (2006.01)
*G06F 3/033* (2013.01)
*G06F 3/048* (2013.01)
*G11B 27/00* (2006.01)
*G11B 27/034* (2006.01)
*G11B 27/036* (2006.01)
*G06F 3/0481* (2013.01)

(56) References Cited

U.S. PATENT DOCUMENTS

| | | | | |
|---|---|---|---|---|
| 7,453,035 | B1* | 11/2008 | Evans et al. | 84/477 R |
| 7,603,623 | B1* | 10/2009 | Lengeling et al. | 715/725 |
| 7,608,775 | B1* | 10/2009 | Evans | 84/611 |
| 8,073,160 | B1* | 12/2011 | Classen | 381/119 |
| 8,153,882 | B2* | 4/2012 | Adam et al. | 84/627 |
| 8,514,949 | B1* | 8/2013 | Keller et al. | 375/240.28 |
| 8,572,513 | B2* | 10/2013 | Chaudhri et al. | 715/863 |
| 8,751,971 | B2* | 6/2014 | Fleizach | 715/863 |
| 8,775,480 | B2* | 7/2014 | Carson et al. | 707/803 |
| 2004/0094017 | A1* | 5/2004 | Suzuki et al. | 84/609 |
| 2006/0161870 | A1* | 7/2006 | Hotelling et al. | 715/863 |
| 2010/0179674 | A1* | 7/2010 | Willard et al. | 700/94 |
| 2012/0130516 | A1* | 5/2012 | Reinsch et al. | 700/94 |
| 2012/0328265 | A1* | 12/2012 | Sakuragi et al. | 386/278 |
| 2013/0112062 | A1* | 5/2013 | Iriyama | 84/453 |
| 2013/0131850 | A1* | 5/2013 | Carrier | 700/94 |
| 2014/0208922 | A1* | 7/2014 | Adnitt et al. | 84/609 |

OTHER PUBLICATIONS

APPLE: "GarageBand 3 getting Started", Jan. 2006, pp. 1-98. http://manuals.info.apple.com/MANUALS/0/MA132/en_US/GarageBand 3 Getting_Started.pdf.*

APPLE: "GarageBand 3 getting Started", Sep. 11, 2011, pp. 1-98, XP007921902, Retrieved from the Internet: URL:http://web.archive.org/web/*/manuals.info.apple.com/en/GarageBand_3_getting_Started.pdf.

"Three-Level Audio Object Display for a Personal Computer Audio Editor", IBM Technical Disclosure Bulletin, International Business Machines Corp. (Thornwood), US, vol. 30, No. 10, Mar. 1, 1988, pp. 351-353, XP000104962, ISSN: 0018-8689.

Extended European Search Report dated Jul. 1, 2014 in corresponding European Patent Application No. 14152201.1 (8 pages).

* cited by examiner

METHODS AND SYSTEMS FOR AN OBJECT-ORIENTED ARRANGEMENT OF MUSICAL IDEAS

CROSS-REFERENCE TO RELATED APPLICATIONS

This patent application claims priority to Provisional Patent Application No. 61/756,922 filed on Jan. 25, 2013, which is herein incorporated by reference in its entirety.

FIELD OF THE DISCLOSURE

The present disclosure is generally directed to computer-based music creation.

BACKGROUND

A growing number of creative individuals today have access to computers, hardware and software that allows them to create, record and arrange music. Traditional digital audio workstations (DAWs), such as GarageBand, Sequel, Fruity Loops, etc., are constantly expanding to include new features, but these DAWs employ outdated and cumbersome user interfaces, which often include static timelines, tracks-and-lanes, and limiting studio hardware paradigms (e.g., mixers, tape machines, effects units, etc.). The use of such linear interfaces represents a significant hurdle to non-technical musicians of any level, including professional musicians, and discourages many of them from participating in computer-based music creation. Even those who eventually master the skills required to benefit from such linear interfaces are required to constantly switch between the creative right-brain activities and the logical left-brain activities, in order to adhere to the static linear timeline requirement. Such switching disrupts the creative flow.

Embodiments disclosed below describe systems and methods for a non-linear computer-based music creation, mimicking and complementing the cognitive process of musicians when they compose and arrange music.

BRIEF DESCRIPTION OF THE DRAWINGS

The accompanying drawings, which are incorporated in and constitute a part of this specification, illustrate exemplary embodiments. In the drawings.

DETAILED DESCRIPTION

Reference will now be made in detail to exemplary embodiments, examples of which are illustrated in the accompanying drawings. Wherever possible, the same reference numbers are used throughout the drawings to refer to the same or like parts.

In one embodiment, a method for playing a plurality of audio objects is provided. The method includes displaying the plurality of audio objects on a display, each audio object being displayed at a location having a horizontal component and a vertical component, wherein the location of each audio object is changeable by a user. The method further includes, responsive to a first playback command, playing each of the plurality of audio objects, wherein each audio object starts playing after a delay corresponding to the location of the audio object. In some embodiments, the delay after which the audio object starts playing may be proportional to the horizontal component of the audio object's location, and at least two of the plurality of audio objects may be displayed at locations having different horizontal components. The method can further comprise recording an audio input, identifying a starting time at which the audio input exceeds a predefined sound level threshold, storing the recorded audio input, wherein the stored audio input comprises the audio input recorded before the starting time, and creating a new audio object associated with the stored audio input. The method can further comprise, upon detecting a request to combine a first object and a second object, assigning the first object and the second object to a new group of objects, wherein each of the first and the second objects comprises either one of the plurality of audio objects or a previously created group of objects comprising two or more of the plurality of audio objects.

In another embodiment, a non-transitory computer-readable medium is encoded with instructions which, when executed by a processor, causes the processor to execute the method described above.

In yet another embodiment, an electronic device comprising a processor is provided, wherein the processor is configured to execute the method described above.

Figure 1:
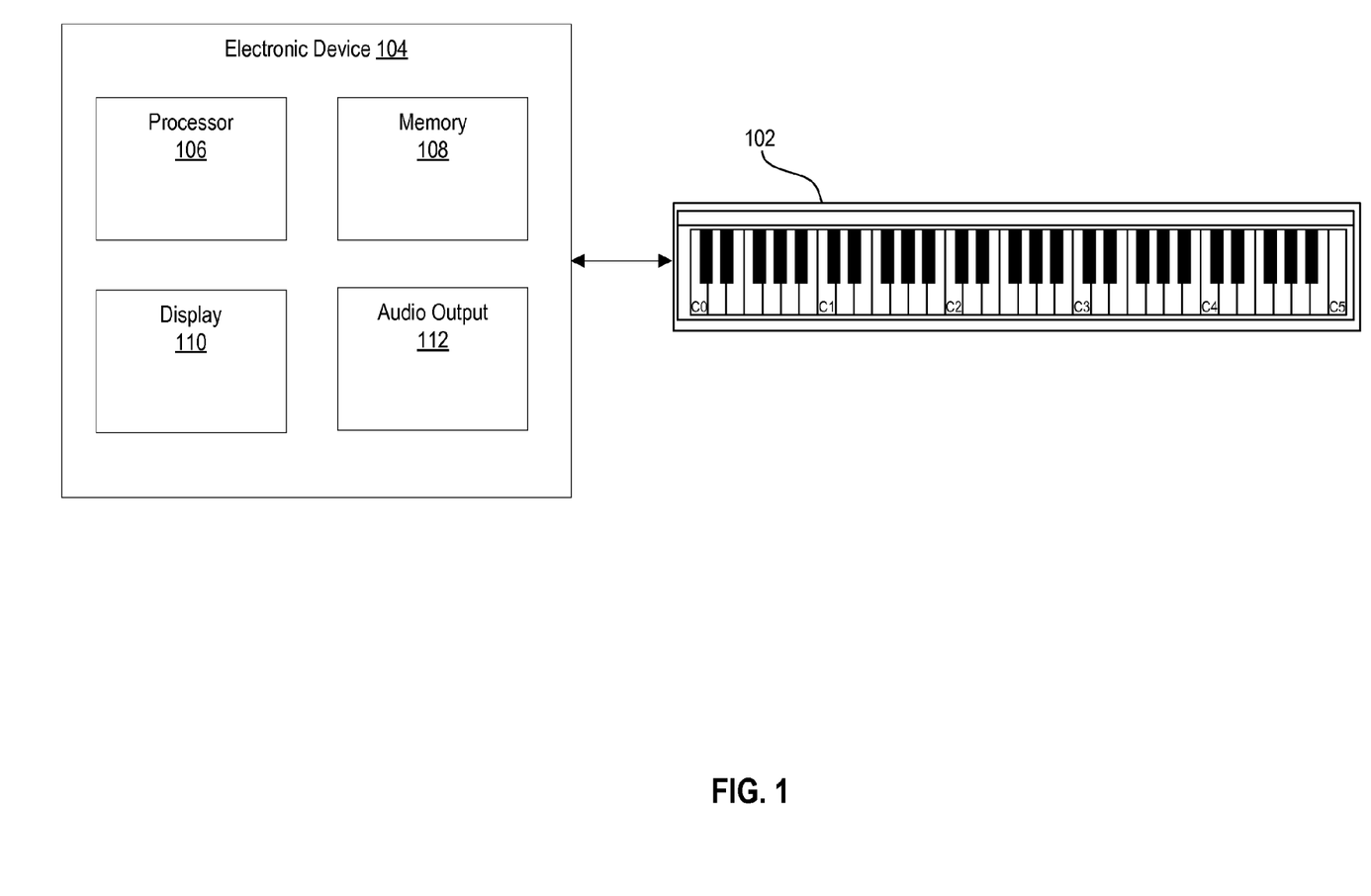
FIG. 1 is a block diagram illustrating an exemplary computer-based music creation system.

FIG. 1 is a block diagram illustrating an exemplary computer-based music creation system, in accordance with a disclosed embodiment. The system can include, among other things, an audio input device 102 and an electronic device 104. Electronic device 104 can be communicatively coupled to audio input device 102, either wirelessly or in a wired manner. Furthermore, electronic device 104 can be coupled to audio input device 102 through a network (not shown), such as the Internet, or any combination of WAN/LAN networks.

Audio input device 102 can be any device that can generate analog or digital electrical signals, such as an electric guitar, a digital piano, a conventional instrument coupled to electronic device 104 via a microphone, etc. Audio input device 102 can also be an electronic device that generates commands (e.g., MIDI commands), where the commands, when executed by a processor, can cause generation of sounds.

Electronic device 104 can be any computer system with audio-processing capabilities, such as a PC, a laptop, a tablet computer or a smartphone, and can include, among other things, a processor 106, a memory 108, an internal or external display 110, and an audio output device 112. In some embodiments, processor 106, memory 108, display 110 and audio output device 112 are not included within electronic device 104, but can be communicatively coupled with electronic device 104.

Audio output device 112 can be any device that can receive electrical signals and generate sounds based on the electrical signals. Audio output device 112 can also be any device that receives electrical signals corresponding to commands (e.g., MIDI commands) and generates sounds in accordance with the commands.

Processor 106 can include one or more processing units capable of executing instructions. For example, processor 106 can include general purpose central processing units (CPUs), field-programmable gate arrays (FPGAs), and digital signal processors (DSPs). The instructions can be stored on memory 108, which can include one or more volatile memories, such as RAM, and tangible non-transitory computer-readable storage mediums, such as a hard disk, a compact disk (CD-ROM) a digital versatile disk (DVD-ROM or DVD-RAM) or any type of semiconductor memory. Memory 108 can also store instructions for executing a digital audio workstation (DAW) application.

The DAW application (hereinafter, "the application") can receive audio data (e.g., from audio input device 102), process and rearrange audio data (e.g., using processor 106), store audio data (e.g., in memory 108), playback audio data (e.g., using audio output 112), output audio data to another electronic device (e.g., back to audio input device 102), and visualize audio data (e.g., on display 110). The user can control and communicate with the application through an application interface, and using input devices, such as a mouse, a keyboard, or audio input device 102.

Although particular types of devices and networks are described, it will be appreciated that other devices and networks can be used without departing from the spirit and scope of the embodiments described herein.

Figure 2:
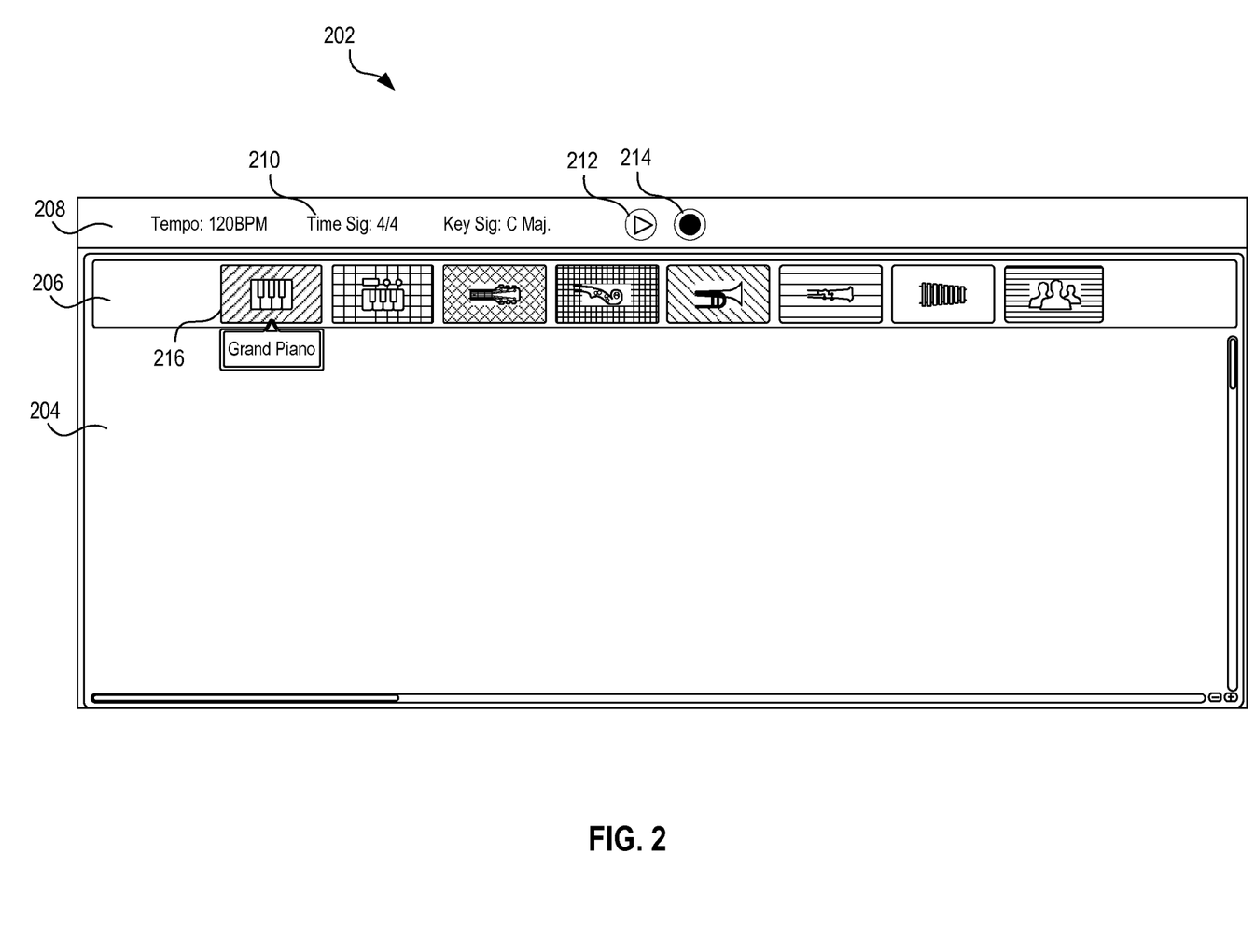
FIG. 2 illustrates an exemplary application interface, in accordance with a disclosed embodiment.

FIG. 2 shows an exemplary application interface, in accordance with a disclosed embodiment. The application interface can include an application window 202, which can include an arranger window 204, instrument toolbar 206, and a control panel 208. Although application window 202 is depicted in FIG. 2 as including arranger window 204, instrument toolbar 206, and control panel 208, in various embodiments, arranger window 204, instrument toolbar 206, and control panel 208 may be in separate application windows.

Control panel 208 can include, among other things, audio information 210, a playback button 212, and a record button 214. Instrument toolbar 206 can include instrument buttons 216 associated with different musical instruments or sounds. Instrument buttons 216 can have different colors (represented by different hatch patterns) and can depict and/or name the musical instruments they represent.

Figure 3:
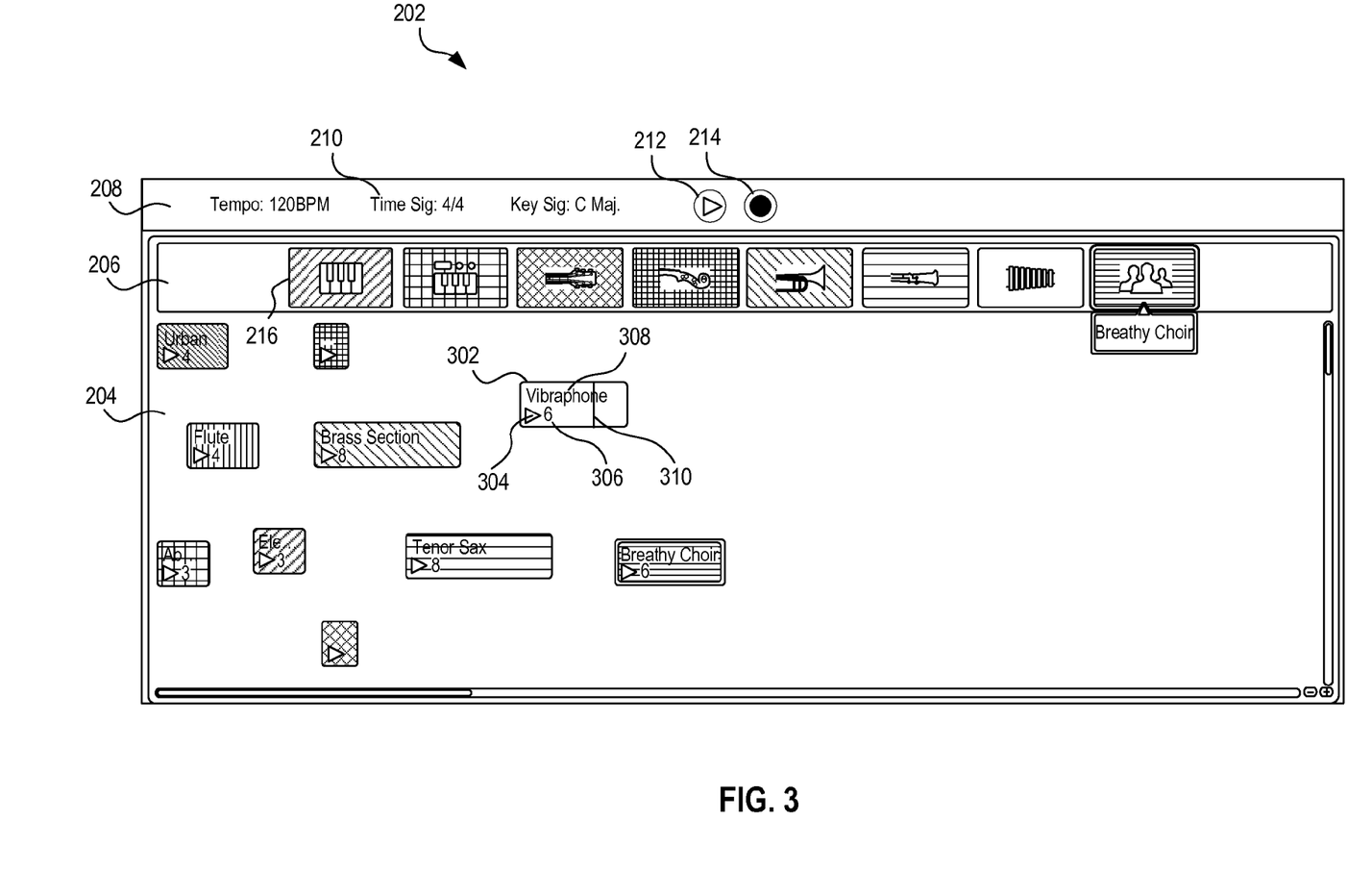
FIG. 3 illustrates an exemplary application interface, in accordance with a disclosed embodiment.

FIG. 3 shows an exemplary application interface, in accordance with a disclosed embodiment. According to this embodiment, the user can use the application interface to create one or more audio objects 302. The user can create an audio object, for example, by importing (e.g. loading) a pre-recorded audio clip (e.g., from a file) or by recording a new audio clip (e.g., by pressing record button 214 and recording audio input received from audio input device 102).

It will be appreciated that the term "audio clip" can refer to any clip that, when executed (played) by a processor, can produce sounds. For example, audio clips can include compressed or uncompressed audio data of any format (e.g., MP3, WAV, OGG, M4A, WMA, etc.), or a compressed or uncompressed set of commands or notations which, when executed by a processor, can cause generation of sounds (e.g., MIDI). Moreover, it will be appreciated that the term "audio," as used throughout this disclosure (as in "audio data," "audio input," audio output," "audio file," etc.) can refer to any data that can directly or indirectly (e.g., upon being processed by a processor), cause generation of sounds.

The newly created audio object can be automatically associated with the pre-recorded or newly recorded audio clip, and placed at a predefined or arbitrary location within the arranger window. The audio object can be represented by a predefined shape, such as a rectangle or, as illustrated in FIG. 3, a rounded rectangle. The user can freely move the audio objects within the arranger window, for example, by dragging them with a mouse and releasing them at a new location. Multiple audio objects can be selected and moved simultaneously while maintaining their relative positions with respect to each other.

In some embodiments, each audio clip can also be associated with a specific instrument, such as piano, guitar, drums, etc. Thus, when an audio clip is played (e.g., via audio output 112), the produced sound may correspond to a specific instrument associated with the audio clip. The type of instrument associated with the audio object can be indicated by a clip label 308 appearing within the audio object and/or by the color of the audio object, which can match the color of the corresponding instrument button 216. Clip label 308 can be automatically assigned or entered by the user, and can reflect the type of instrument associated with the audio object or otherwise identify the audio object.

In some embodiments, for example, when the audio clip is in MIDI format, the audio clip can be re-associated with a different instrument. For example, the user can drag the audio object onto a particular instrument button 216, and the audio clip associated with the audio object can be automatically re-associated with the instrument that is associated with that instrument button.

In some embodiments, the relative length (duration) of the audio clip can be represented by the length of the audio object associated with it, and/or by a length label 306, which can indicate the length of the audio clip in any unit of time (e.g., in beats, bars, milliseconds, and so forth). In some embodiments, the length of the audio clip is not limited to full beats, bars, etc., and can be, for example, one half or three quarters of a bar.

In some embodiments, the user can play an audio clip associated with an audio object using "cued playback," for example, by clicking on a clip-play button 304 displayed at the audio object, or by double-clicking on the audio object with a mouse or other input device such as a stylus or a fingertip. In some embodiments, an audio object can display a now-line 310 indicating the current playback position of the audio clip associated with that object. When the audio clip is playing and the end of the audio clip is reached, the playback can loop back and start playing the audio clip from the beginning.

Multi-Clip Objects and Song Objects

In some embodiments, a user can combine two or more audio objects into a group, or a "multi-clip" object, and treat the multi-clip as a single musical unit. For example, the user can play the multi-clip, move it to another location within the arranger, combine it with other multi-clips to create song-clips, clone the multi-clip, save it into a file, and so forth. In some embodiments, all functions and operations that can be applied to an audio object can also be applied to a multi-clip.

Figure 4A:
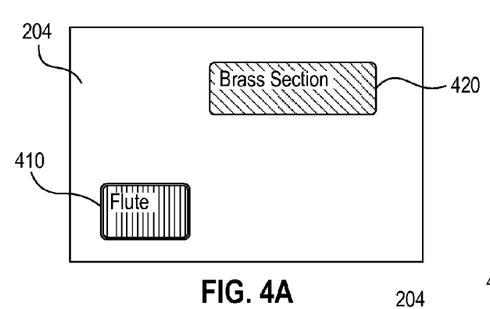
FIGS. 4A-4E illustrate a method of creating a multi-clip object, in accordance with various embodiments.

FIGS. 4A-4E illustrate a method of creating a multi-clip object, in accordance with various embodiments. In FIG. 4A, two audio objects are depicted as located at arbitrary positions within the arranger window 204. In some embodiments, a user can move (e.g., by dragging with a mouse) a first audio object 410 closer to a second audio object 420, until the first audio object is in the immediate vicinity of, or within a predefined distance from, the second audio object. Once the first audio object is positioned within a predefined distance from the second audio object, the application may optionally display a combination indicator 402 indicating that the two audio objects are ready to be combined into a common multi-clip object. The combination indicator may be, for example, in the form of a rectangle encompassing both audio objects. In addition, the application may display a placement indicator 404, indicating where the first object would be placed upon release.

Upon detecting the combination and/or the placement indicator, the user can perform an action confirming that he or she wants to combine the two audio objects into a single multi-clip object. The confirmation action can include, for example, the release of a mouse button. Upon detecting or being notified of the confirmation action, the application may create a new multi-clip object 404 and assign to it, or associate with it, the first and the second audio objects. The new multi-clip object may be represented by a multi-clip window, which may have a header section that comprises, for example, a multi-clip playback button 408, a multi-clip length indicator 412 (e.g., indicating the total length of the multi-clip in bars), and a multi-clip timeline having bar indicators 406. A user may be able to move a multi-clip window (e.g., by dragging it with a mouse) around within the arranger window, and doing so may cause all the multi-clip's audio objects to move as well without affecting the relative positions of the audio objects with respect to each other.

Figure 4B:
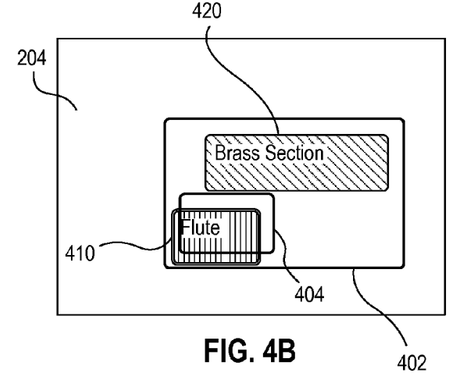
Figure 4C:
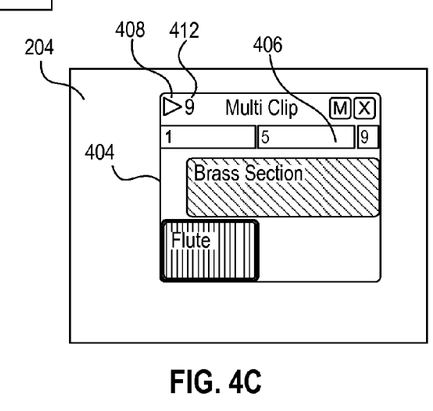

In some embodiments, the initial position within the multi-clip window of the first audio object relative to the second audio object is determined by the relative position of the two objects just before the confirmation action was performed. For example, as illustrated in FIGS. 4B and 4C, if the first audio object was positioned anywhere above or below the second audio object, upon receiving the confirmation action, the application may adjust the vertical position of the first object to make the first object vertically adjacent to the second object (while keeping it above or below the second object). This is described as "vertical snapping." To determine whether the first object is "above" or "below" the second object, the application may check, for example, whether the center of the first object is above the top edge of the second object or below the bottom edge of the second object, respectfully.

Figure 4D:
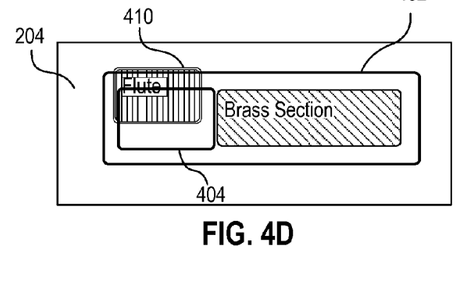
Figure 4E:
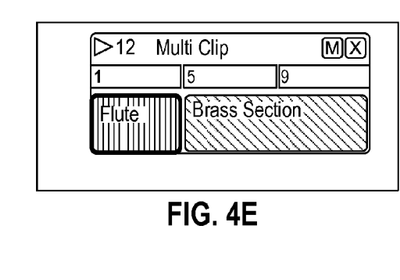

As another example, as illustrated in FIGS. 4D and 4E, if the first audio object was positioned anywhere to the left or to the right of the second audio object, upon receiving the confirmation action, the application may adjust the horizontal position of the first object to make the first object horizontally adjacent to the second object (while keeping it to the left or to the right of the second object). This is described as "horizontal snapping." To determine whether the first object is "to the left" or "to the right" of the second object, the application may check, for example, whether the center of the first object is to the left from the left edge of the second object, or to the right of the right edge of the second object, respectfully. In some embodiments, when the first object is vertically snapped to the second object, the relative horizontal positioning between the two objects is maintained.

In some embodiments, after the initial positioning of the audio objects within the multi-clip window, the user is free to move the audio objects within the multi-clip window. In some embodiments, after any movement of an audio objects by the user, the application can correct the audio object's position by "snapping" it to another audio object, either vertically or horizontally. In other embodiments, the horizontal snapping can be optional and can be permanently or temporarily disabled by the user, allowing the user to create pauses (e.g. spaces) between audio objects.

In some embodiments, after the user moves an audio object within a multi-clip, the application can horizontally adjust the final placement of the object such that the object's left edge coincides with the nearest bar or with the nearest beat within a bar. In some embodiments, this "snapping to nearest bar/beat" feature can be enabled or disabled by the user.

Figure 5:
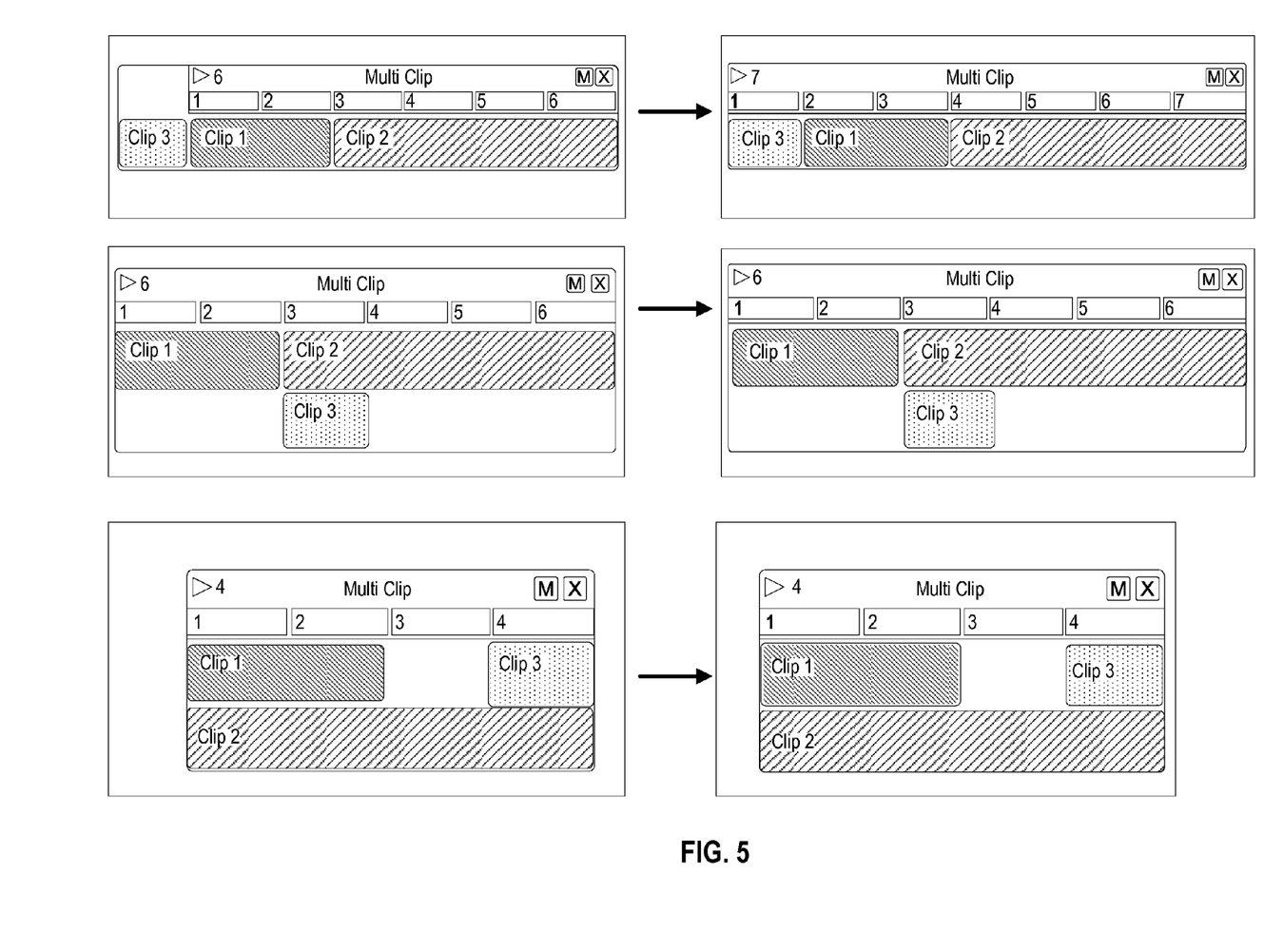
FIG. 5 illustrates a method of adding additional audio objects to a multi-clip, in accordance with a disclosed embodiment.

In some embodiments, additional audio objects may be added to an existing multi-clip, as illustrated in FIG. 5. Additional audio objects may be added in a fashion similar to the one described above with respect to creating a multi-clip using two audio objects. The application may make sure that at any given time each audio object within a multi-clip is "snapped" to at least one other audio object, either vertically or horizontally.

Figure 6:
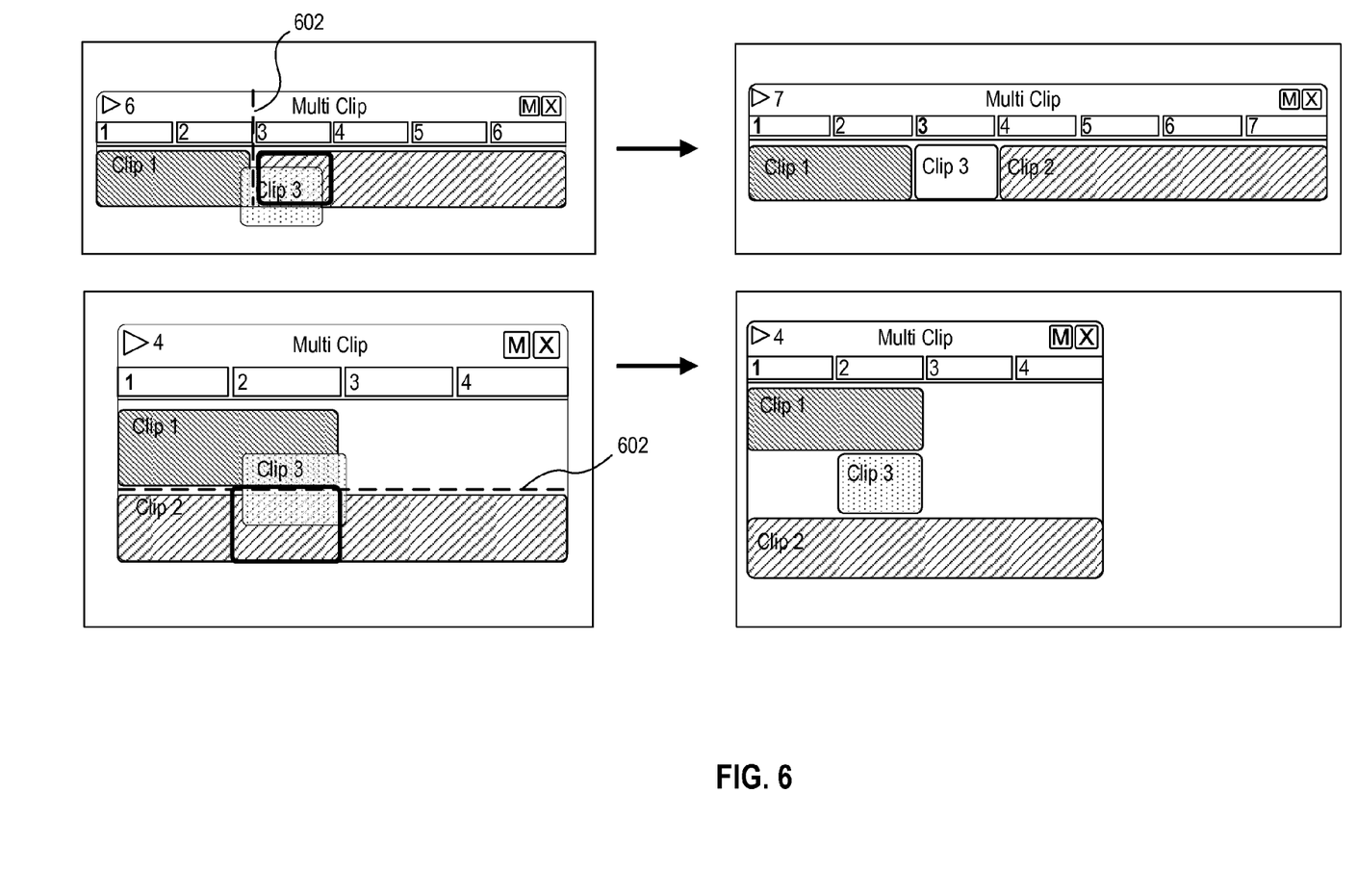
FIG. 6 illustrates a method of inserting an audio object between two adjacent audio objects, in accordance with a disclosed embodiment.

In some embodiments, as illustrated in FIG. 6, when an audio object is moved into a position that is approximately on the edge (either horizontal or vertical) between two adjacent audio objects, the application will display a push line 602 between the two objects, indicating that the objects will be pushed away upon releasing the moved object, and when the object is released, the application will move the adjacent audio objects away from each other (horizontally, vertically, or both) to make space for the inserted audio object, and will place the inserted object in the created "space" adjacent to each of the pushed-away objects.

Figure 7:
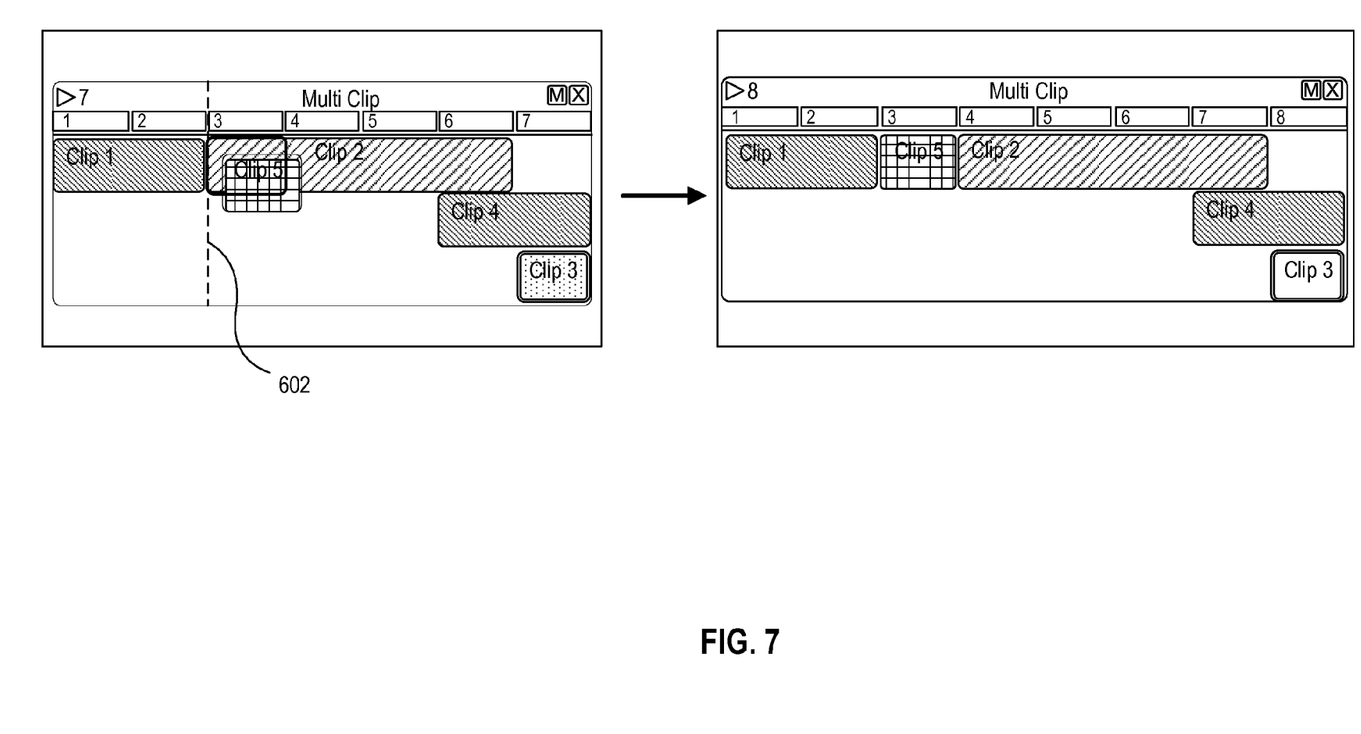
FIG. 7 illustrates a method of right-shifting when inserting an audio object between two horizontally adjacent audio objects, in accordance with a disclosed embodiment.

In some embodiments, as illustrated in FIG. 7, when an audio object is inserted between two horizontally-adjacent audio objects, all audio objects within the multi-clip window that are located to the right of the insertion position may be moved to the right by a distance corresponding to the length of the inserted audio object. This can be described as "right-shifting."

Figure 8:
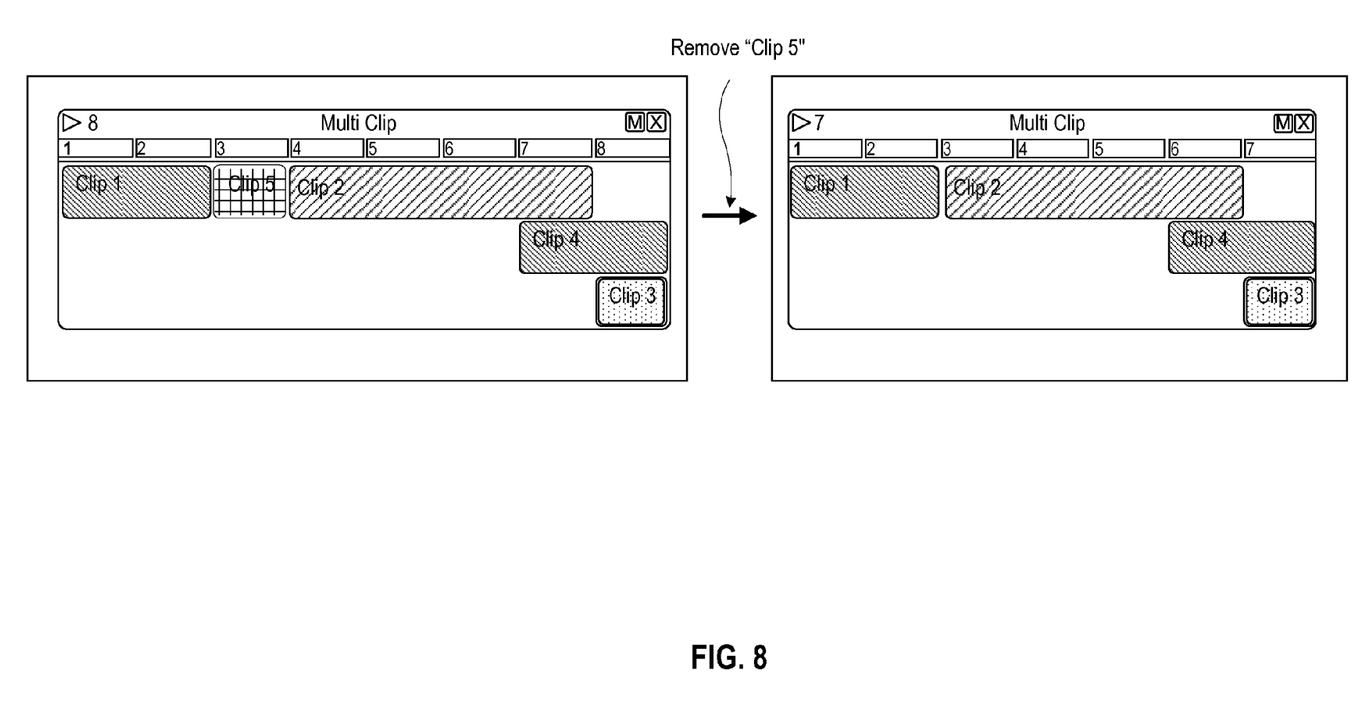
FIG. 8 illustrates a method of closing a gap after an audio object is moved away, in accordance with a disclosed embodiment.

In some embodiments, as illustrated in FIG. 8, when an audio object (e.g. the audio object sandwiched between the two audio objects on top row of the multi-clip on the left) is vertically or horizontally adjacent to two other objects, and the user moves that object away from its position, the gap between the two other objects may be closed, and the two other objects may automatically become adjacent (e.g. by being "snapped" to each other). Furthermore, if three initial objects within a multi-clip object are initially horizontally adjacent, upon removing the middle object, all objects within the multi-clip window that are located to the right of the removed object are moved to the left by a distance corresponding to the length of the removed object.

In some embodiments, when an audio object located in a multi-clip is moved away from the multi-clip window by the user, the audio clip can become disassociated from the multi-clip object. If after such a disassociation, the multi-clip contains only one audio object, the remaining audio object can also become disassociated from the multi-clip object. This may result in the destruction of the multi-clip object.

FIG. 8 also demonstrates that audio objects associated with audio clips that are associated with different instruments can have the same vertical position within the multi-clip window. In other words, the vertical positions of audio objects can be independent of the instruments or the formats of the audio clips associated with the audio objects. Thus, audio objects "Clip 1," "Clip 5," and "Clip 2" in FIG. 8 can all have the same vertical position (first row) even though they are associated with different instruments, as indicated by the different hatch patterns.

Figure 9:
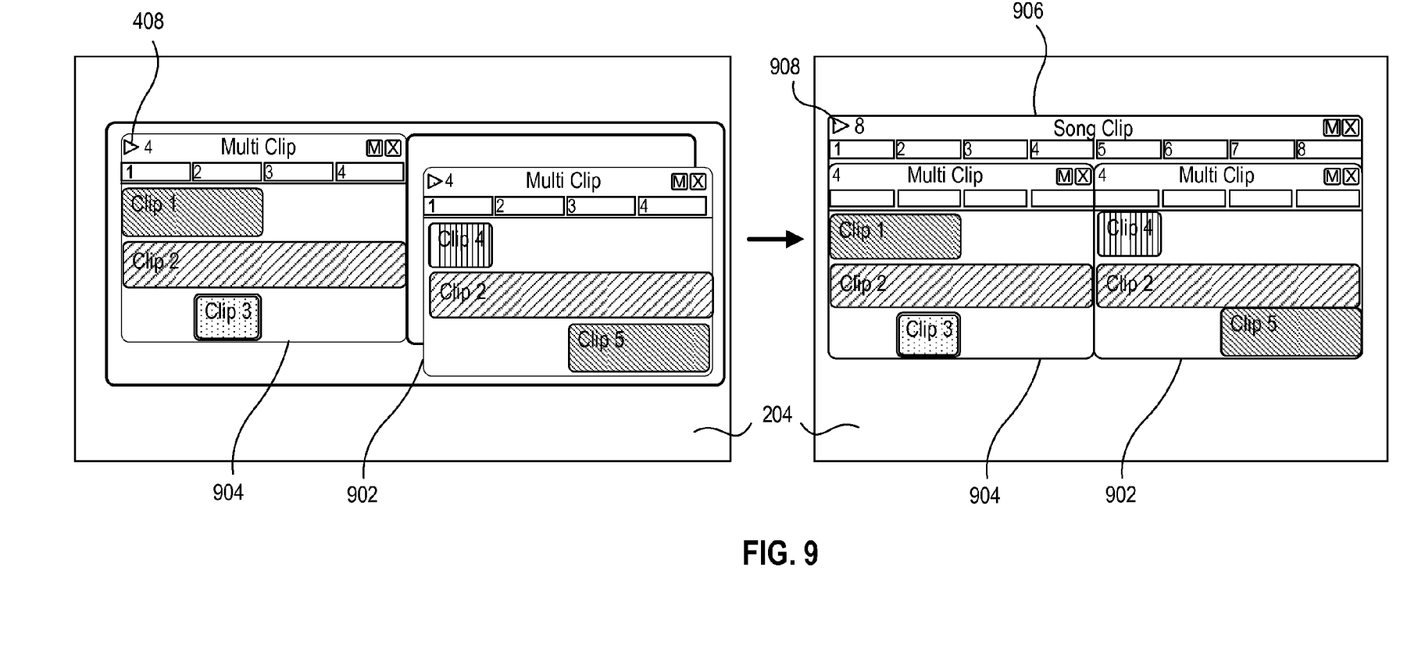
FIG. 9 illustrates a method of combining two or more multi-clip objects into a song object, in accordance with a disclosed embodiment.

In many embodiments, as illustrated in FIG. 9, two or more multi-clip objects may be combined into a single song object in any of the ways discussed above with respect to combining two or more audio objects into a multi-clip object. That is, multi-clip objects may be combined into a single song object by placing a first multi-clip object 902 within a predefined distance from another multi-clip object 904; additional multi-clip objects or audio objects may be added to the song object; and all the principles discussed above in connection with audio objects (e.g., positioning, snapping, pushing, gap closing, right shifting, etc.) may also apply to the interactions of multi-clip objects with other multi-clip objects or audio objects within a song object. Similarly, the song object may be enclosed into a song window 906 having a song playback button 908. Song objects may contain one or more multi-clip objects and one or more audio objects. When the user clicks on the song play button, the application may play all the multi-clip objects and audio objects contained in it in accordance with their relative horizontal positions.

In various embodiments, song objects may further be combined into higher hierarchy objects, and so on, indefinitely. In other embodiments, the application may not allow the combination of song objects into any higher hierarchy objects.

In some embodiments, audio, multi-, or song objects can be duplicated. For example, the user can select an object, issue a copy command (e.g., Ctrl+C) and a paste command (e.g., Ctrl+V), after which a duplicate of the object will appear in the same or in a different arranger window. In some embodiments, when an audio clip is duplicated, the application can automatically combine the original audio object and the duplicate audio object into a multi-clip object. The application can also position the two audio objects horizontally adjacent to each other in the new multi-clip. Similarly, when a multi-clip object is duplicated, the application can automatically combine the original multi-clip object and the duplicate multi-clip object into a song object. The application can also position the two multi-clip objects horizontally adjacent to each other in the new song object.

In some embodiments, the user can create an object that is an alias of another object. Unlike a duplicated object, which is a separate, standalone object, an alias object remains associated with the object based on which it was created. Accordingly, when an object has one or more alias objects, whenever that object changes, the application will automatically update each of the alias objects accordingly. For example, when the user creates an alias multi-clip object based on a multi-clip object, any changes made to one of the multi-clip objects (e.g., adding, removing, or moving audio objects within it) will automatically be reflected in the other multi-clip object, and vice versa. At the same time, the two objects can be played or moved independently of each other.

Cued Playback

In some embodiments, the user can play one or more objects (e.g. audio objects, multi-clip objects and song objects) using cued playback. Cue-playing means, for example, that the application will start playing the object immediately upon receiving the playback command, without regard to the object's location within a window. The user can cue-play a single object, for example, by pressing on the object's playback button (e.g. clip-play button 304, multi-clip playback button 408, or song playback button 908). Alternatively, the user can mark (select) multiple objects for cued playback, for example, by right-clicking on their respective play buttons, and then issuing a command to cue-play all the marked objects. When one or more objects are marked for cued playback, issuing a cued playback command will simultaneously start playing the marked objects, irrespective to their locations within the window. For example, when cue-played, an audio clip located at the top left corner of the arranger window can start playing at the same time as a multi-clip object located at the bottom right corner of the arranger window. In some embodiments, newly imported or recorded clips can be automatically marked for cued playback.

After initiating the cued playback of one or more objects, the user can initiate the cued playback of additional objects (e.g., by pressing their respective play buttons), in which case the additional objects may start playing either asynchronously or synchronously with the currently playing objects. In the asynchronous mode, the playback of the additional objects may start immediately after receiving the cued playback command by the user. In the synchronous mode, the cued playback of the additional objects is delayed until the currently playing objects reach the end of the current time segment. For example, the cued playback of the additional objects may begin only at the beginning of the next bar or the next beat.

Non-Cued Playback

In addition to cued playback, the user can play back all the objects (e.g. audio objects, multi-clip objects and song objects) in accordance with their respective horizontal positions within the arranger window. Playing an audio object can include playing the audio clip associated with the audio object. Playing a multi-clip object can include playing all of the audio objects contained in the multi-clip in accordance with their respective horizontal positions within the multi-clip window. Playing a song object can include playing all the audio objects and the multi-clip objects contained in the song window in accordance with their respective horizontal positions within the song window.

In some embodiments, non-cued playback, that is, playing an object in accordance with its horizontal position, is implemented by starting the playback of the object at a time that corresponds to the left edge of the rectangle (or the window) representing the object. Thus, for example, any object whose left edge is located at the leftmost position within the containing window can start playing right after the playback command is issued, without delay. As another example, if the distance between an object's left edge and the left edge of the containing window is equivalent to N bars, the object can start playing after a delay of N bars from the time the playback command is issued. In other words, the delay between the playback command and the time an object starts playing can be proportional to the distance from the object's left edge to the left edge of the containing window.

The user can initiate the playback command, for example, by pressing playback button 212, after which all objects within the arranger window, including audio objects, multi-clip objects and song objects will start playing at times in accordance with their horizontal positions within the arranger window. Alternatively, the user can initiate playback of an individual multi-clip object or song object by pressing its multi-clip playback button or song playback button, respectively. Referring to the example illustrated in FIG. 9, pressing the multi-clip playback button 408 of multi-clip object 904 will start playing audio objects "Clip 1" and "Clip 2" immediately, and audio object "Clip 3" will start playing after a one-bar delay. Similarly, pressing song playback button 908 of song object 906 will start playing multi-clip 904 immediately, and multi-clip object 902 will start playing after a four-bar delay. Thus, audio object "Clip 5" will start playing two bars after multi-clip object 902 starts playing, that is, six bars after song playback button 908 was pressed.

While combining audio objects into multi-clip and song objects can facilitate a user's manipulation of the audio objects, it will be appreciated that in some embodiments, the user may choose not to use multi-clip or song objects, and still benefit from the methods and techniques disclosed herein. In other words, positioning, snapping, pushing, gap closing, right shifting and other features described above in connection with multi-clip and song objects can be applied to audio objects that are within the arranger window and outside of any multi-clip or song objects.

Figure 10:
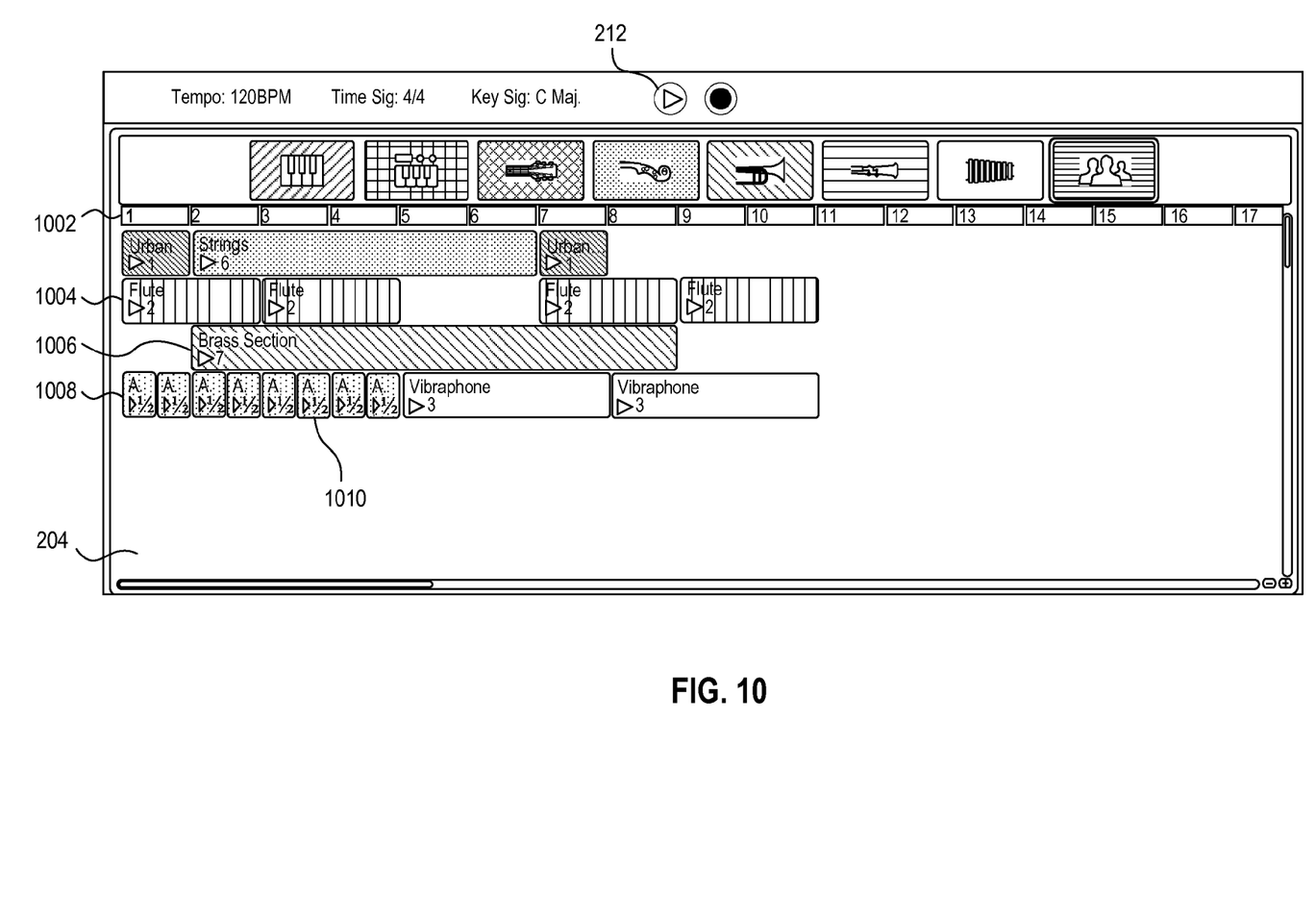
FIG. 10 illustrates a system and methods for arranging and playing audio objects within the arranger window, in accordance with a disclosed embodiment.

For example, in an embodiment illustrated in FIG. 10, the arranger window includes, among other things, a global timeline 1002, and audio objects that are not grouped into any multi-clip or song objects. In this example, when the user presses the playback button 212, the application will start playing each of the audio objects within the arranger window after a delay corresponding to each audio object's horizontal location within the arranger window. For example, the application can start playing each object at a time corresponding to the left edge of the rectangle representing the audio object. Thus, audio objects 1004 and 1008 may start playing without delay (immediately after the user issues the playback command), audio object 1006 may start playing after a delay equivalent to one bar (e.g., two seconds if the tempo is 120 beats per minute and there are four beats in one bar), and audio object 1010 may start playing after a delay equivalent to 2.5 bars (7 seconds, in this example).

At the same time, as discussed above, the user may cue-play one or more audio objects. For example, the user can click on the clip-play button of audio object 1006, and the object will start playing immediately, play for seven bars, and (optionally) loop back and repeat. Alternatively, the user can mark several audio objects (e.g., 1006 and 1004) and issue a command to cue-play the marked objects, that is, to play the marked objects simultaneously, without delay, and irrespective of their horizontal location within the arranger window. The cued playback command can be issued using a special cued playback button (not shown) or using the playback button 212, which can function as a cued playback button when the application detects that one or more audio objects are marked for cued playback.

Furthermore, during the cued playback of one or more audio objects (e.g., 1006 and 1004), the user can cue-play another audio object (e.g., 1010). The other audio object may start playing either asynchronously or synchronously with the objects that are already playing, that is, either immediately after the cued playback command is issued, or only after the objects already playing reach the beginning of the next time segment, for example, at the beginning of the next bar.

Recording a New Audio Object

In various embodiments, when no objects are marked for cued playback and the user issues a recording command indicating a request to start recording a new audio clip (e.g., by pressing record button 214), the application waits for an audio input (e.g., from audio input device 102) and starts recording immediately upon detecting the audio input.

In some embodiments, when some objects are marked for cued playback and the user makes a request to record a new audio clip, the application waits for a predefined time (e.g., one bar period) during which it may provide a beat indication (e.g., via a metronome), and thereafter starts recording the new clip as well as playing back the marked objects.

In some embodiments, when some objects are already playing and the user makes a request to start recording a new audio clip, the application waits for an audio input and thereafter starts recording immediately upon detecting the audio input. If no objects are playing or marked for cued playback when the recording command is issued, the application can provide a beat indication and wait for an audio input indefinitely, until such audio input is detected.

If audio input device 102 is a MIDI device (e.g., a MIDI controller), detecting the audio input can include detecting that some MIDI data has been received from the audio input device. Alternatively, if audio input device 102 is, for example, an analog device, detecting the audio input can include detecting that an analog signal above a predefined noise level has been received.

In some embodiments, whenever the application is "waiting" for an audio input, the application can be constantly recording the audio input data (e.g., received from the audio input device) and saving the recorded data into a memory (e.g., memory 108). During the recording, the application can be analyzing the audio input data, and waiting for a starting time. The application can determine that the starting time has occurred when it detects that the audio input data satisfies a predefined condition. For example, when the application determines that audio input data corresponds to a sound level above a predefined sound level threshold, the application establishes a starting time. In some embodiments, after establishing the starting time, the application discards any data recorded prior to the starting time.

In other embodiments, however, the application data can "hide" that prior data without discarding it. In these embodiments, the user can decide, for any recorded data (e.g., an audio clip), whether he or she wants some portion of the hidden data to be played before the non-hidden data (data recorded after the starting time) is played. For example, the user may indicate that when a specific audio clip is played, a predetermined period (e.g., 100 milliseconds) of hidden data recorded immediately prior to the starting time should be played before the non-hidden data is played. This can be useful, for example, when the data recorded just before the starting time is musically valuable, even though its sound levels might have been below the predefined sound level threshold.

In some embodiments, individual audio objects, multi-clip objects, and song objects, as well as the whole environment of the application interface itself, may be saved (e.g., stored into one or more files) and later restored (e.g., loaded from one or more files).

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

Various computer programs or program modules based on the disclosures made herein may be created using a variety of programming techniques. For example, computer programs or modules created using assembly language or programming languages such as Java, C, or C++ may be used to implement various aspects of the methods, systems and interfaces described herein. One or more of such software programs or modules can also be integrated into new or existing computer systems, computer-readable media, or communications software.

The elements in the claims are to be interpreted broadly based on the language employed in the claims, and are not to be limited to examples described in the present specification or figures. It is intended, therefore, that the embodiments disclosed in the specification and figures be considered exemplary only.

What is claimed is:

1. A method for playing a plurality of audio objects, the method comprising:
   displaying the plurality of audio objects on a display, each audio object being displayed at a location having a horizontal component and a vertical component, wherein the location of each audio object is changeable by a user;
   responsive to a first playback command, playing each of the plurality of audio objects, wherein each audio object starts playing after a delay corresponding to the location of the audio object;
   wherein the delay after which the audio object starts playing is proportional to the horizontal component of the audio object's location, and wherein at least two of the plurality of audio objects are displayed at locations having different horizontal components; and
   wherein each of the plurality of audio objects corresponds to an audio clip associated with a musical instrument, and at least two of the plurality of audio objects are displayed at locations having the same vertical component, and correspond to audio clips associated with different musical instruments.

2. The method of claim 1, wherein each of the plurality of audio objects is selectable by the user, the method further comprising:
   responsive to a second playback command, simultaneously starting playback of one or more audio objects, at a point in time corresponding to a beginning of a time segment, selected by the user.

3. The method of claim 2, further comprising delaying the simultaneous start until a point in time corresponding to a beginning of a new time segment.

4. The method of claim 1, further comprising:
   upon determining that the location of a first object of the plurality of the audio objects has been changed, and that the changed location is within a predefined distance from the location of a second object of the plurality of the audio objects, adjusting the location of the first object so as to make the first object adjacent to the second object.

5. The method of claim 1, further comprising:
   upon determining that the location of a first object of the plurality of the audio objects has been changed, and that the changed location is within a predefined distance from an edge between two other objects of the plurality of the audio objects, adjusting the location of the first object and at least one of the two other objects so as to put the first object between and adjacent to the two other objects.

6. The method of claim 1, further comprising:
   recording an audio input;
   identifying a starting time at which the audio input exceeds a predefined sound level threshold;
   storing the recorded audio input, wherein the stored audio input comprises the audio input recorded before the starting time; and
   creating a new audio object associated with stored audio input.

7. The method of claim 1, further comprising:
   upon detecting a request to combine a first object and a second object, assigning the first object and the second object to a new group of objects, wherein each of the first and second objects comprises either one of the plurality of audio objects or a previously created group of objects comprising two or more of the plurality of audio objects.

8. The method of claim 7, wherein detecting the request to combine comprises determining that the location of the first object was changed and that the changed location is within a predefined distance from the location of the second object.

9. A non-transitory computer-readable medium encoded with instructions which, when executed by a processor, cause the processor to execute a method comprising:
   displaying the plurality of audio objects on a display, each audio object being displayed at a location having a horizontal component and a vertical component, wherein the location of each audio object is changeable by a user;
   responsive to a first playback command, playing each of the plurality of audio objects, wherein each audio object starts playing after a delay corresponding to the location of the audio object;
   wherein the delay after which the audio object starts playing is proportional to the horizontal component of the audio object's location, and wherein at least two of the plurality of audio objects are displayed at locations having different horizontal components; and
   wherein each of the plurality of audio objects corresponds to an audio clip associated with a musical instrument, and wherein at least two of the plurality of audio objects are displayed at locations having the same vertical component, and correspond to audio clips associated with different musical instruments.

10. The non-transitory computer-readable medium of claim 9, wherein each of the plurality of audio objects is selectable by the user, and wherein the method further comprises:
    responsive to a second playback command, simultaneously starting playback of one or more audio objects, at a point in time corresponding to a beginning of a time segment, selected by the user.

11. The non-transitory computer-readable medium of claim 10, wherein the method further comprises delaying the simultaneous start until a point in time corresponding to a beginning of a new time segment.

12. The non-transitory computer-readable medium of claim 9, wherein the method further comprises:
    upon determining that the location of a first object of the plurality of the audio objects has been changed, and that the changed location is within a predefined distance from the location of a second object of the plurality of the audio objects, adjusting the location of the first object so as to make the first object adjacent to the second object.

13. The non-transitory computer-readable medium of claim 9, wherein the method further comprises:
    upon determining that the location of a first object of the plurality of the audio objects has been changed, and that the changed location is within a predefined distance from an edge between two objects of the plurality of the audio objects, adjusting the location of the first object and at least one of the two other objects so as to put the first object between and adjacent to the two other objects.

14. The non-transitory computer-readable medium of claim 9, wherein the method further comprises:
    recording an audio input;
    identifying a starting time at which the audio input exceeds a predefined sound level threshold;
    storing the recorded audio input, wherein the stored audio input comprises the audio input recorded before the starting time; and creating a new audio object associated with the stored audio input.

15. The non-transitory computer-readable medium of claim 9, wherein the method further comprises:
upon detecting a request to combine a first object and a second object, assigning the first object and the second object to a new group of objects, wherein each of the first and the second objects comprises either one of the plurality of audio objects or a previously created group of objects comprising two or more of the plurality of audio objects.

16. The non-transitory computer-readable medium of claim 15, wherein detecting the request to combine comprises determining that the location of the first object was changed and that the changed location is within a predefined distance from the location of the second object.

17. An electronic device comprising a processor, the processor configured to:
display the plurality of audio objects on a display, each audio object being displayed at a location having a horizontal component and a vertical component, wherein the location of each audio object is changeable by a user;
responsive to a first playback command, play each of the plurality of audio objects, wherein each audio object starts playing after a delay corresponding to the location of the audio object;
wherein the delay after which the audio object starts playing is proportional to the horizontal component of the audio object's location, and wherein at least two of the plurality of audio objects are displayed at locations having different horizontal components;
wherein each of the plurality of audio objects corresponds to an audio clip associated with a musical instrument, and wherein at least two of the plurality of audio objects are displayed at locations having the same vertical component, and correspond to audio clips associated with different musical instruments.

18. The electronic device of claim 17, wherein each of the plurality of audio objects is selectable by the user, and the processor is further configured to:
responsive to a second playback command, simultaneously starting playback of one or more audio objects, at a point in time corresponding to a beginning of a time segment, selected by the user.

19. The electronic device of claim 18, wherein the processor is further configured to delay the simultaneous start until a point in time corresponding to a beginning of a new time segment.

20. The electronic device of claim 17, wherein the processor is further configured to:
upon determining that the location of a first object of the plurality of the audio objects has been changed, and that the changed location is within a predefined distance from the location of a second object of the plurality of the audio objects, adjusting the location of the first object so as to make the first object adjacent to the second object.

21. The electronic device of claim 17, wherein the processor is further configured to:
upon determining that the location of a first object of the plurality of the audio objects has been changed, and that the changed location is within a predefined distance from an edge between two other objects of the plurality of the audio objects, adjusting the location of the first object and at least one of the two other objects so as to put the first object between and adjacent to the two other objects.

22. The electronic device of claim 17, wherein the processor is further configured to:
record an audio input;
identify a starting time at which the audio input exceeds a predefined sound level threshold;
store the recorded audio input, wherein the stored audio input comprises the audio input recorded before the starting time; and
create a new audio object associated with the stored audio input.

23. The electronic device of claim 17, wherein the processor is further configured to:
upon detecting a request to combine a first object and a second object, assign the first object and the second object to a new group of objects, wherein each of the first and the second objects comprises either one of the plurality of audio objects or a previously created group of objects comprising two or more of the plurality of audio objects.

24. The electronic device of claim 23, wherein detecting the request to combine comprises determining that the location of the first object was changed and that the changed location is within a predefined distance from the location of the second object.

* * * * *